US012515958B2

(12) United States Patent
Numrich et al.

(10) Patent No.: US 12,515,958 B2
(45) Date of Patent: Jan. 6, 2026

(54) SILICA AEROGEL WITH INCREASED ALKALINE STABILITY

(71) Applicant: EVONIK OPERATIONS GMBH, Essen (DE)

(72) Inventors: Uwe Numrich, Gross-Zimmern (DE); Stefan Bade, Michelbach le Haut (FR); Nicolas Marion, Saint-Louis (FR); Matthias Koebel, Brüttisellen (CH); Wim Malfait, Zürich (CH); Stefanie Hauser, Näfels (CH); Nicolas Vogel, Horgen (CH)

(73) Assignee: Evonik Operations GmbH, Essen (DE)

( * ) Notice: Subject to any disclaimer, the term of this patent is extended or adjusted under 35 U.S.C. 154(b) by 562 days.

(21) Appl. No.: 17/922,203

(22) PCT Filed: Apr. 20, 2021

(86) PCT No.: PCT/EP2021/060255
§ 371 (c)(1),
(2) Date: Oct. 28, 2022

(87) PCT Pub. No.: WO2021/219444
PCT Pub. Date: Nov. 4, 2021

(65) Prior Publication Data
US 2023/0348285 A1  Nov. 2, 2023

(30) Foreign Application Priority Data
Apr. 30, 2020  (EP) ..................................... 20172350

(51) Int. Cl.
*C01B 33/152* (2006.01)
*C01B 33/158* (2006.01)
*C01B 33/159* (2006.01)

(52) U.S. Cl.
CPC ........ *C01B 33/1585* (2013.01); *C01B 33/152* (2013.01); *C01B 33/159* (2013.01)

(58) Field of Classification Search
CPC .. C01B 33/1585; C01B 33/152; C01B 33/159
See application file for complete search history.

(56) References Cited

U.S. PATENT DOCUMENTS

| | | | |
|---|---|---|---|
| 2,595,262 A | 5/1952 | Hood | |
| 3,532,473 A | 10/1970 | Biegler et al. | |
| 3,562,177 A | 2/1971 | Teicher et al. | |
| 3,574,027 A | 4/1971 | Bonnet | |
| 4,048,290 A | 9/1977 | Lee | |
| 4,175,159 A | 11/1979 | Raleigh | |
| 4,212,925 A | 7/1980 | Kratel et al. | |
| 4,247,708 A | 1/1981 | Tsutsumi et al. | |
| 4,276,274 A | 6/1981 | Heckel | |
| 4,286,990 A | 9/1981 | Kleinschmidt et al. | |
| 4,297,143 A | 10/1981 | Kleinschmidt et al. |
| 5,086,031 A | 2/1992 | Deller et al. |
| 5,183,710 A | 2/1993 | Gerbino |
| 5,458,916 A | 10/1995 | Kratel et al. |
| 5,556,689 A | 9/1996 | Kratel et al. |
| 5,565,142 A | 10/1996 | Deshpande et al. |
| 5,685,932 A | 11/1997 | Stohr et al. |
| 5,776,240 A | 7/1998 | Deller et al. |
| 5,851,715 A | 12/1998 | Barthel et al. |
| 6,099,749 A | 8/2000 | Boes et al. |
| 6,268,423 B1 | 7/2001 | Mayer et al. |
| 6,303,256 B1 | 10/2001 | Kerner et al. |
| 6,472,067 B1 | 10/2002 | Hsu et al. |
| 6,479,156 B1 | 11/2002 | Schmidt et al. |
| 7,241,336 B2 | 7/2007 | Scharfe et al. |
| 7,562,534 B2 | 7/2009 | Jibb et al. |
| 7,674,476 B1 | 3/2010 | Schwertfeger et al. |
| 7,855,248 B2 | 12/2010 | Stenzel et al. |
| 8,333,946 B2 | 12/2012 | Gottschalk et al. |
| 8,389,617 B2 | 3/2013 | Meyer et al. |
| 8,603,353 B2 | 12/2013 | Menzel et al. |
| 8,962,519 B2 | 2/2015 | Heindl et al. |
| 9,233,986 B2 | 1/2016 | Kratel et al. |
| 9,540,247 B2 | 1/2017 | Stenzel et al. |
| 9,593,797 B2 | 3/2017 | Kulprathipanja et al. |
| 9,784,402 B2 | 10/2017 | Menzel |

(Continued)

FOREIGN PATENT DOCUMENTS

| CA | 2 201 186 | 9/1997 |
|---|---|---|
| CN | 106316439 | 1/2017 |

(Continued)

OTHER PUBLICATIONS

Malfait et al ("Surface Chemistry of Hydrophobic Silica Aerogels", Chem. Mater. 2015, 27, 6737-6745) (Year: 2015).*
Non Final Office Action mailed May 11, 2023 for copending U.S. Appl. No. 16/978,164, filed Sep. 3, 2020.
Response to Non Final Office Action filed Jul. 28, 2023 for for copending U.S. Appl. No. 16/978,164, filed Sep. 3, 2020.
U.S. Appl. No. 17/927,040, filed Nov. 22, 2022, Giesseler.
International Search Report for corresponding PCT/EP2021/060255 filed Apr. 20, 2020.
Written Opinion of the International Searching Authority for corresponding PCT/EP2021/060255 filed Apr. 20, 2020.
International Preliminary Report on Patentability for PCT/EP2021/060255 filed Apr. 20, 2020.
European Search Report and Search Opinion for corresponding EP 20 17 2350 filed Apr. 30, 2020.

(Continued)

*Primary Examiner* — Jiangtian Xu
(74) *Attorney, Agent, or Firm* — Law Office of Michael A. Sanzo, LLC

(57) ABSTRACT

The present invention relates to a process for producing a hydrophobized silica aerogel, comprising the following steps: a) preparing a hydrophobized silica gel comprising alkoxy groups; b) drying of the hydrophobized silica gel obtained in step a); c) treatment of the product obtained in step b) with a gas mixture comprising water and a base or an acid. A hydrophobized silica aerogel with a reduced alkoxy group content, suitable for thermal insulation applications, is also provided.

17 Claims, No Drawings

(56) References Cited

U.S. PATENT DOCUMENTS

| | | |
|---|---|---|
| 9,878,911 B2 | 1/2018 | Maisels et al. |
| 10,005,942 B2 | 6/2018 | Kim et al. |
| 10,125,234 B2 | 11/2018 | Hoffman et al. |
| 10,179,751 B2 | 1/2019 | Geisler et al. |
| 10,618,815 B2 | 4/2020 | Hindelang et al. |
| 10,618,849 B2 | 4/2020 | Albinus et al. |
| 10,843,965 B2 | 11/2020 | Jantke et al. |
| 11,046,850 B2 | 6/2021 | Bender et al. |
| 2003/0095905 A1 | 5/2003 | Scharfe et al. |
| 2006/0027227 A1 | 2/2006 | Everett et al. |
| 2007/0220904 A1 | 9/2007 | Jibb et al. |
| 2009/0311159 A1 | 12/2009 | Gray |
| 2010/0146992 A1 | 6/2010 | Miller |
| 2010/0300132 A1 | 12/2010 | Schultz |
| 2012/0064345 A1 | 3/2012 | Gini |
| 2012/0286189 A1 | 11/2012 | Barthel et al. |
| 2013/0071640 A1 | 3/2013 | Szillat |
| 2014/0150242 A1 | 6/2014 | Kratel et al. |
| 2014/0323589 A1 | 10/2014 | Lazár et al. |
| 2015/0000259 A1 | 1/2015 | Dietz |
| 2016/0082415 A1 | 3/2016 | Drexel et al. |
| 2016/0084140 A1 | 3/2016 | Dietz |
| 2016/0223124 A1 | 8/2016 | Kulprathipanja et al. |
| 2016/0258153 A1* | 9/2016 | Koebel ............... C01B 33/1585 |
| 2017/0014792 A1 | 1/2017 | Bonnardel et al. |
| 2017/0029681 A1 | 2/2017 | Kim et al. |
| 2017/0233297 A1 | 8/2017 | Albinus et al. |
| 2017/0268221 A1 | 9/2017 | Geisler et al. |
| 2018/0001576 A1 | 1/2018 | Koebel et al. |
| 2018/0065892 A1 | 3/2018 | Geisler et al. |
| 2019/0276358 A1 | 9/2019 | Schultz et al. |
| 2019/0382952 A1 | 12/2019 | Geisler et al. |
| 2020/0031720 A1 | 1/2020 | Geisler et al. |
| 2020/0062661 A1 | 2/2020 | Geisler et al. |
| 2020/0124231 A1 | 4/2020 | Geisler et al. |
| 2021/0039954 A1 | 2/2021 | Numrich et al. |
| 2021/0269359 A1 | 9/2021 | Geisler et al. |
| 2021/0292233 A1 | 9/2021 | Numrich et al. |
| 2021/0292238 A1 | 9/2021 | Albinus et al. |
| 2023/0002627 A1 | 1/2023 | Lazar et al. |
| 2023/0062574 A1 | 3/2023 | Menzel et al. |
| 2023/0110025 A1 | 4/2023 | Gärtner et al. |

FOREIGN PATENT DOCUMENTS

| | | |
|---|---|---|
| CN | 106830878 | 6/2017 |
| DE | 952891 | 11/1956 |
| DE | 30 37 409 | 5/1982 |
| DE | 199 48 394 | 2/2001 |
| DE | 20 2007 013 074 | 3/2008 |
| DE | 10 2007 020 716 | 11/2008 |
| DE | 10 2007 031 635 | 1/2009 |
| DE | 10 2007 042 000 | 3/2009 |
| DE | 10 2007 051 830 | 5/2009 |
| DE | 10 2008 005 548 | 7/2009 |
| DE | 10 2008 036 430 | 2/2010 |
| DE | 10 2010 040 346 | 3/2012 |
| DE | 10 2013 016 705 | 4/2015 |
| DE | 10 2014 203 091 | 8/2015 |
| EP | 0 032 176 | 7/1981 |
| EP | 0 340 707 | 11/1989 |
| EP | 0 645 576 | 3/1995 |
| EP | 0 647 591 | 4/1995 |
| EP | 0 937 755 | 8/1999 |
| EP | 2 028 329 | 2/2009 |
| EP | 2 204 513 | 7/2010 |
| EP | 2 910 724 | 8/2015 |
| EP | 3 447 038 | 8/2017 |
| EP | 2621873 | 4/2018 |
| EP | 3 403 818 | 11/2018 |
| EP | 3 498 672 | 6/2019 |
| FR | 2873677 | 2/2006 |
| JP | H 10-152360 | 6/1998 |
| KR | 10-2012-0070948 | 7/2021 |
| WO | WO 99/05447 | 2/1999 |
| WO | WO 03/064025 | 8/2003 |
| WO | WO 2005/028195 | 3/2005 |
| WO | WO 2006/097668 | 9/2006 |
| WO | WO 2010/126792 | 11/2010 |
| WO | WO 2011/020671 | 2/2011 |
| WO | WO 2011/066209 | 6/2011 |
| WO | WO 2011/076518 | 6/2011 |
| WO | WO 2011/083174 | 7/2011 |
| WO | WO 2012/041823 | 4/2012 |
| WO | WO 2012/044052 | 4/2012 |
| WO | WO 2013/053951 | 4/2013 |
| WO | WO 2014/090790 | 6/2014 |
| WO | WO 2014/095277 | 6/2014 |
| WO | WO 2015/007450 | 1/2015 |
| WO | WO 2016/045777 | 3/2016 |
| WO | WO 2016/171558 | 10/2016 |
| WO | WO 2017/097768 | 6/2017 |
| WO | WO 2017/102819 | 6/2017 |
| WO | WO 2021/069351 | 4/2021 |
| WO | WO 2021/239475 | 12/2021 |

OTHER PUBLICATIONS

English language translation of the International Search Report for PCT/EP2018/075446 filed Sep. 20, 2018; corresponding to copending U.S. Appl. No. 16/978,164.

English language translation of the Written Opinion of the International Searching Authority for PCT/EP2018/075446 filed Sep. 20, 2018; corresponding to copending U.S. Appl. No. 16/978,164.

International Preliminary Report on Patentability for PCT/EP2018/075446 filed Sep. 20, 2018; corresponding to copending U.S. Appl. No. 16/978,164.

International Search Report for PCT/EP2019/068361 filed Jul. 9, 2019; corresponding to copending U.S. Appl. No. 17/260,345.

Written Opinion of the International Searching Authority for PCT/EP2019/068361 filed Jul. 9, 2019; corresponding to copending U.S. Appl. No. 17/260,345.

International Preliminary Report on Patentability for PCT/EP2019/068361 filed Jul. 9, 2019; corresponding to copending U.S. Appl. No. 17/260,345.

International Search Report for PCT/EP2021/050105 filed Jan. 6, 2021; corresponding to copending U.S. Appl. No. 17/792,400.

Written Opinion of the International Searching Authority for PCT/EP2021/050105 filed Jan. 6, 2021; corresponding to copending U.S. Appl. No. 17/792,400.

International Preliminary Report on Patentability for PCT/EP2021/050105 filed Jan. 6, 2021; corresponding to copending U.S. Appl. No. 17/792,400.

Partial European Search Report and Search Opinion for EP 20151588, filed Jan. 14, 2020; corresponding to copending U.S. Appl. No. 17/792,400.

Matthias, et al., "Basic characteristics and applications of aerosol: 30. The chemistry and physics of the aerosol Surface," *Journal of Colloid & Interface Science* 125(1):61-68 (Sep. 1988).

Pajonk, et al., "Physical properties of silica gels and aerogels prepared with new polymeric precursors," *J. Non-Cryst. Solids* 186(2):1-8 (Jun. 1995).

Schreiner, et al., "Intercomparison of thermal conductivity measurements on an expanded glass granulate in a wide temperature range," *International Journal of thermal Sciences* 95:99-105 (2015).

Somana, Chotangada Gautham, "Evaluation of Aerogel Composite Insulations by Characterization and Experimental Methods," Thesis; B.Eng., R.V. College of Engineering, Banglore, India, (2012).

Ulmann's Encyclopedia of Industrial Chemistry, "Silica" chapter, published online on Apr. 15, 2008, DOI: 10.1002/14356007.a23_583.pub3.

Wim, et al., Surface Chemistry of Hydrophobic Silica Aerogels, » *Chemistry of Materials* 27(19):6737-6745 (Oct. 2015).

U.S. Appl. No. 16/478,169, filed Jul. 16, 2019, US-2020/0031720 A1, Jan. 30, 2020, Geisler.

U.S. Appl. No. 16/484,368, filed Aug. 7, 2019, US-2019/0382952 A1, Dec. 9, 2019, Geisler.

U.S. Appl. No. 16/605,342, filed Oct. 15, 2019, US-2020/0062661 A1, Feb. 27, 2020, Geisler.

(56) References Cited

OTHER PUBLICATIONS

U.S. Appl. No. 16/620,481, filed Dec. 6, 2019, US-2020/0124231 A1, Apr. 23, 2020, Geisler.
U.S. Appl. No. 16/978,164, filed Sep. 3, 2020, US-2021/0039954 A1, Feb. 11, 2021, Numrich.
U.S. Appl. No. 17/260,227, filed Jan. 14, 2021, US-2021/0269359 A1, Sep. 2, 2021, Geisler.
U.S. Appl. No. 17/260,345, filed Jan. 14, 2021, US-2021/0292233 A1, Sep. 23, 2021, Numrich.
U.S. Appl. No. 17/260,371, filed Jan. 14, 2021, US-2021/0292238 A1, Sep. 23, 2021, Albinus.
U.S. Appl. No. 17/792,400, filed Jul. 13, 2022, Lazar.
U.S. Appl. No. 17/792,471, filed Jul. 13, 2022, Menzel.
U.S. Appl. No. 17/802,656, filed Aug. 26, 2022, Gärtner.

\* cited by examiner

SILICA AEROGEL WITH INCREASED ALKALINE STABILITY

CROSS REFERENCE TO RELATED APPLICATIONS

The present application is US national stage of international application PCT/EP2021/060255, which had an international filing date of Apr. 20, 2021 and which was published on Nov. 4, 2021. The application claims priority to EP 20172350.9, filed on Apr. 30, 2020. The content of these prior applications is hereby incorporated by reference in its entirety.

The present invention relates to a special process for producing silica aerogels, to the silica aerogel with a reduced ethoxy group content, and to the use of such an aerogel for thermal insulation.

By virtue of their very low thermal conductivity and material density, silica-based aerogels and xerogels find increasing use as highly efficient insulation materials, for example in building insulation. Cost-effective production of aerogels and xerogels is becoming increasingly important. Numerous methods for their production are known. Typically, the starting point is waterglass (sodium silicate) or tetraalkoxysilanes (organosilicates) such as tetraethyl orthosilicate (TEOS) and tetramethyl orthosilicate (TMOS) and less prevalently hydrophobic T-type alkoxysilanes such as methyltrimethoxysilane (MTMS) or methyltriethoxysilane (MTES) are used as silicon raw materials, which form initially a silica sol and then a silica gel.

Aerogels have in the past traditionally been produced exclusively through supercritical drying, i.e. drying from a supercritical fluid typically lower alcohols (high-temperature supercritical drying or HTSCD) and nowadays preferably $CO_2$ (low-temperature supercritical drying or LTSCD). In the drying process, it was necessary that the critical parameters specific to the solvent used, such as temperature and pressure, were not exceeded. The critical temperature and critical pressure for $CO_2$ are around 31° C. and around 74 bar. Carrying out the reaction at such high process pressure necessitates relatively cost-intensive process control and investment on equipment for the production of aerogels.

An important breakthrough in the production of aerogels or xerogels of similar structure was achieved by subcritical drying at standard pressure from solvent-containing, hydrophobized gels. This method is described for example in U.S. Pat. No. 5,565,142 A1. Such drying under subcritical conditions makes it possible to produce materials with almost identical properties to the supercritically dried aerogels. In the early years these had been named xerogels according to the classical definition, a term that is still used today for aerogels subcritically dried from solvents. Rather than the classical definition of aerogels used based on the nature of their production, the definition based on typical material properties (density <0.30 g/cm³, porosity >85%, pore size 20 to 80 nm) is instead used hereinafter. Subcritically dried materials are thus referred to still as aerogels and not as xerogels.

WO 2012/044052 A2 relates to the preparation of optically transparent and non-transparent silica aerogel in granular form. This is done by injecting a waterglass sol into an alcohol phase, which results in the formation of a gel. The gel is additionally exchanged with alcohol and hydrophobized using a silylation reagent. The gel is then dried at standard pressure or under reduced pressure. An essential step of this process is washing with ethanol, which is necessary in order to remove the water from the hydrogel phase. Due to the use of alcohol, the resulting aerogel inevitably contains a small amount of alkoxy groups.

WO2013/053951 A1 discloses a process for producing a xerogel that comprises the following sequence of process steps: (a) producing an alcohol-containing sol by hydrolysis of tetraethoxysilane (TEOS); (b)-(c) gelation and aging of the sol; (d) hydrophobizing the sol produced and aged in steps (b) and (c); (e) optional pre-drying of the hydrophobized sol at a temperature below 80° C., and (f) complete drying at a temperature above 100° C. Such aerogels derived from hydrolysed organosilicates also contain a significant amount of unhydrolyzed ethoxy groups.

W. J. Malfait et al. describe in Chem. Mater. 2015, Vol 27, pp 6737-6745 characterization of surface chemistry of various types of hydrophobized aerogels and related silica foams using NMR techniques. Thus, the samples prepared from tetraethoxysilane (TEOS), polyethoxydisiloxane (PEDS), or waterglass precursors were hydrophobized with trimethylsilyl (TMS) groups using hexamethyldisilazane (HMDS), trimethylchlorosilane (TMSCl), or hexamethyldisiloxane (HMDSO). Table 2 of this publication shows the content of trimethylsilyl (Si—O—TMS), ethoxy (Si—O-Et) and silanol (Si—OH) groups determined by NMR techniques. All the prepared aerogel samples modified with TMS-groups contained relatively high trimethylsilyl group contents (2.9-3.8 mmol/g). The content of ethoxy and silanol groups of samples 1, 2 and 4 was 0.3, 0.6, 0.9 and 1.0, 1.0, 1.8 mmol/g, respectively.

Thus, silica aerogel and similar materials prepared from precursors containing alkoxy groups, particularly ethoxy groups in the precursor system, or derived from the sol-gel and/or solvent exchange process in a solvent system that contains significant amounts of alcohols, e.g. ethanol, will always contain substantial amounts of unhydrolyzed ethoxy groups.

It was found, that this usual remaining ethoxy-group content leads to some noticeable drawbacks during the practical use of such silica aerogels, particularly when integrated into mineral binder-based formulations. In such cases, unreacted ethoxy groups tend to hydrolyse quickly in the presence of alkaline constituents of some thermal insulating compositions, e.g. lime- or cement-based binders in aerogel containing render, cement or other mortar mixtures. The resulting thermally insulating mineral compositions then show a significant degradation of mechanical integrity, durability and eventually also thermal insulation performance.

The technical problem addressed by the present invention is to provide silica aerogels with increased stability against such alkaline compounds. Another objective of the invention is that of providing a process for producing such silica aerogels.

The object of the present invention is a process for producing a hydrophobized silica aerogel, comprising the following steps:
  a) preparing a hydrophobized silica gel, comprising alkoxy groups;
  b) drying of the hydrophobized silica gel obtained in step a);
  c) treatment of the product obtained in step b) with a gas mixture comprising water and a base or an acid.

U.S. Pat. No. 3,562,177 discloses a thickening agent comprising hydrophilic silica aerogel particles containing from 0.10% to 2.5% by weight of ammonia, prepared by reacting of a silica aerogel obtained from a waterglass solution, with ammonia. However, U.S. Pat. No. 3,562,177 is silent about treatment of a hydrophobized silica aerogel with water and ammonia.

It was surprisingly found that the inventive process provides hydrophobized silica aerogels with a reduced content of residual alkoxy groups, which are particularly suitable for preparing thermal insulation composition containing alkaline components.

In step a) of the process according to the invention, a hydrophobized silica gel is obtained. Step a) preferably further comprises the steps of a1) providing a mixture comprising silica sol, a2) gelation of the mixture obtained in step a1), optionally a3) aging of the gel obtained in step a2), a4) hydrophobization of the gel obtained in step a2), and optionally a5) solvent exchange in the gel having previously been obtained in step a2) and optionally aged in step a3).

The alkoxy groups are preferably low molecular C1 through C4 aliphatic alkoxy groups, which can be selected from the group consisting of methoxy ($OCH_3$), ethoxy ($OC_2H_5$), propoxy ($OC_3H_7$), butoxy ($OC_4H_9$), and mixtures thereof. Most preferably, alkoxy groups are ethoxy groups The silica sol can be prepared in step a1) of the process starting from a sodium silicate (waterglass) solution, ion exchanged waterglass, silicic acid or colloidal silica and mixtures thereof. An alcohol can be present during preparation or gelation of the sol or added later during solvent exchange and/or hydrophobization prior to the drying of the resulting silica aerogel. In this case, the resulting silica aerogel usually comprises residual unhydrolyzed alkoxy groups.

The silica gel can be obtained from the corresponding silica sol produced in step a1) by hydrolysis of an organosilicate $Si(OR)_4$, in neat form or as a solution in an alcohol. The organosilicate may be selected from a group consisting of tetraethyl orthosilicate (TEOS, $R=C_2H_5$), tetramethyl orthosilicate (TMOS, $R=CH_3$), tetraisopropyl orthosilicate (TPOS, R=i-Pr), and mixtures or oligomers thereof.

Reaction of organosilicates with water results in their hydrolysis, with the alkoxy groups (OR) bonded to silicon being partially or completely replaced by silanol groups Si—OH, which may in turn react with one another and form siloxane linkages (Si—O—Si) through so-called polycondensation reactions. Hydrolysis and condensation are dynamic reactions involving many interconnected chemical equilibria that are strongly influenced by catalysts such as acids and bases. Such a hydrolyzate of an organosilicate, consisting of nanoscale colloid particles composed of amorphous silica having a significant residual proportion of unhydrolyzed alkoxy groups Si—OR, usually have low viscosity and are referred to as a silicon dioxide sol or silica sol.

The silica sol may subsequently be diluted using an organic solvent mixture consisting of an alcohol, a hydrophobizing agent, preferably activatable by acid catalysis, and water.

It goes without saying that, in addition to alcohol, silica sol, and hydrophobizing agent, the silica sol mixture used in step a) may contain a small proportion of water, unavoidable impurities, and certain additives customary in the production of silica sols. This mixture may additionally comprise at least one polymerizable functional silane and optionally also one or more monomers capable of forming a polymer structure within the aerogel material to be produced. The polymerizable functional silane advantageously contains groups polymerizable by free radicals, as in the case of the conventional vinyltrialkoxysilanes such as vinyltriethoxysilane and vinyltrimethoxysilane or 3-trialkoxysilylpropyl methacrylates such as trimethoxysilylpropyl methacrylate or triethoxysilylpropyl methacrylate. Preferred monomers are likewise selected from the group of substances polymerizable by free radicals, such as acrylates, vinyl chloride, styrene or divinylbenzene. Additionally or alternatively, additives providing mechanical reinforcement, such as short fibers, for example glass fibers or mineral fibers, may be added to the mixture containing silica sol. Additionally, the sol may also contain at least one organofunctional silane bearing e.g. hydrophobic groups. Such organofunctional silanes can be for ex ample methyltrimethoxysilane, methyltriethoxysilane, n-propyltriethoxysilane, n-propyltrimethoxysilane, n-octyltriethoxysilane, n-octyltrimethoxysilane, iso-propyltriethoxysilane, iso-propyltrimethoxysilane, iso-butyltriethoxysilane, iso-butyltrimethoxysilane, n-butyltriethoxysilane, n-butyltrimethoxysilane, 3-aminopropyltriethoxysilane, 3-aminopropyltrimethoxysilane.

Step a1) of the inventive process can be carried out in the presence of an alcohol selected from the group consisting of methanol, ethanol, n-propanol, isopropanol, butanol, and mixtures thereof, if the precursor is an alkoxysilane or organosilicate.

Step a1) of the inventive process can be carried out in the presence of a majority of water with optional minor fractions of an alcohol selected from the group consisting of methanol, ethanol, n-propanol, isopropanol, butanol, and mixtures thereof, if the precursor is an waterglass or sodium silicate, an ion exchanged sodium silicate or an oligomeric silicic acid solution.

In the inventive process, the silica gel can be obtained by gelification of an inorganic precursor selected from the group consisting of sodium silicate, waterglass, ion exchanged waterglass, silicic acid or colloidal silica and mixtures thereof.

In this case, the solvent system used during any of the processing operations between steps a) and b) can be an alcohol-based solvent system.

In the production of the silica sol, catalytic amounts of an acid and substoichiometric amounts of water are preferably added to an alcoholic solution of the organosilicate, wherein the organosilicate/water/acid molar ratio of 1:1-3.5:0.0001-0.01, more preferably of 1:1-2.5:0.0005-0.005, is adhered to. Examples of acids that may be used are sulfuric acid, hydrogen chloride or nitric acid.

A hydrophobizing agent is understood as meaning a component that imparts hydrophobic, water-repellent properties to an oxide surface. This is achieved through the reaction of a hydrophobizing agent with the silica surface. Examples of typical hydrophobizing agents for silica are organosilanes, organosiloxanes, and organosilazanes. It is known from WO2015/014813 A1 that some of these hydrophobizing agents are capable of being activated by acid catalysis, which means that, in the presence of catalytic amounts of certain acids, they are able to react with a silica surface at lower temperature and/or more rapidly than in the absence of catalyst. Examples of such hydrophobizing agents activatable by acid catalysts, preferably used in the inventive process, include organosiloxanes and other alkylalkoxysilanes. Particularly suitable as hydrophobizing agents activatable by acid catalysts are hexamethyldisiloxane and trialkylalkoxysilanes, especially trimethylalkoxysilanes such as trimethylethoxysilane and trimethylmethoxysilane. The hydrophobizing agents activatable by acid catalysis in the present invention are very particularly preferably selected from the group consisting of hexamethyldisiloxane, trimethylethoxysilane, trimethylmethoxysilane, and mixtures thereof.

Step a) of the inventive process is preferably carried out using a hydrophobizing agent activatable by an acid catalyst selected from the group consisting of hydrogen chloride, nitric acid, sulfuric acid, trimethylchlorosilane, and mixtures thereof.

By adding a base to the mixture comprising silica sol formed in step a1) and preferable subsequent mixing, a gelation process can be initiated in step a2) of the process according to the invention shortly before the final gelation and optional aging of the gel formed in step a2) can take place in step a3).

The previously described Si—OH silanol groups formed through hydrolysis of e.g. the organosilicate groups on the surface of the already-formed colloid particles undergo condensation in step a2), now catalyzed by addition of base, optionally by additional heating, resulting in the formation of a three-dimensional particle network termed the silicon dioxide gel or silica gel. The gel thus formed in an alcohol/hydrophobizing agent medium, which can also be referred to as an "alkogel" or "organogel" if a second co-solvent different from an alcohol or a hydrophobizing agent is present in the solvent mixture, is typically subjected to a further aging step, wherein the particle network structure is mechanically reinforced with the formation of new chemical siloxane bonds in between the interparticle neck region. In practice, the sol system and the amount of base added are usually chosen such that the gelation time is between 5 and 15 minutes.

The gelation of the silica sol, step a2) of the process, and optionally aging of the resulting silica gel, step a3) of the process, is preferably carried out in the presence of a base catalyst selected from the group consisting of ammonia, lower aliphatic alkylamines, aminosilanes, ammonium fluoride, alkali metal hydroxides (in particular sodium hydroxide or potassium hydroxide), alkaline earth metal hydroxides, and mixtures thereof. Lower aliphatic amines are understood as meaning primary, secondary or tertiary alkylamines having a molar mass of less than 500 g/mol. Examples of particularly suitable aminosilanes are aminopropyltrimethoxysilane or aminopropyltriethoxysilane. The base catalyst is particularly preferably selected from the group consisting of ammonia, ammonium fluoride or aminosilanes. The preference is given to adding a dilute solution of the base catalyst in a solvent, for example a dilute alcoholic ammonia solution.

Step a2) is preferably carried out within not more than 1 hour, preferably within 30 minutes, more preferably within 10 minutes, before step a3).

In a particular embodiment of the invention, steps a2) and a3) are carried out in one step, and the addition of the base catalyst and subsequent aging of the silica sol are carried out in the same reactor.

Step a3) may preferably be carried out at a temperature of 60° C. to 130° C., more preferably of 80° C. to 120° C. The usual duration of this step is 5 to 240 minutes, preferably 10 to 180 minutes. More preferably, step a3) of the process according to the invention is carried out at a temperature of 90 to 115° C. within 20 to 75 minutes. Because operations are usually carried out above the boiling point of the mixture (approx. 80° C. if ethanol is used as solvent), the use of pressure reactors is preferable for carrying out steps b2) and c).

In step a4) of the process according to the invention, the hydrophobization of the silica gel produced in step a2) can be initiated by means of adding a hydrophobization catalyst. The hydrophobization catalyst may be added to the gel or else released directly in the silica gel.

Hydrophobizing agents activatable by acid catalysis are preferably used in the process according to the invention. Such hydrophobizing agents are traditionally activated in the presence of Brønsted acids that generate $H^+$ or $H_3O^+$ ions. The gelation process, which proceeds under slightly basic conditions, and the hydrophobizing process, which proceeds under acidic conditions, may thus be carried out in the same organogel as discrete operations with a clear time separation.

In a particularly preferred embodiment of the invention, a hydrophobization catalyst is selected from the group consisting of hydrogen chloride (gaseous or as a solution), nitric acid, sulfuric acid, trimethylchlorosilane, and mixtures thereof. Particular preference is given to using, as hydrophobization catalysts, alcoholic solutions of hydrogen chloride, nitric acid, sulfuric acid or trimethylchlorosilane.

In a further embodiment of the invention, the hydrophobization catalyst is formed in situ in the gel by a free-radical degradation process. The hydrophobization catalyst is advantageously formed by free-radical degradation of previously added organochlorine compounds such as weakly stabilized or unstabilized PVC, trichloromethane, chloroacetone or tetrachlorethylene. The hydrophobization catalyst, which is advantageously HCl, may thus be released at a desired point in time, with release brought about either by electromagnetic radiation (UV, X-rays) or by conventional radical initiators. For gels with high optical transparency and low thickness, photochemical free-radical degradation processes are preferred.

In a further embodiment of the invention, the hydrophobization catalyst is released in the gel by slow-release agents, with release being optionally initiated or accelerated by thermal activation. In this case, preference is given to using as the hydrophobization catalyst hydrogen chloride, nitric acid or sulfuric acid, or precursors thereof, which are released from "slow-release" or "controlled-release" additives present in the sol, such as microcapsules, nanocapsules or particles. These agents are ideally activated via externally controllable process parameters such as pressure, temperature or electromagnetic radiation (light, radio waves, microwaves).

Step a3) and/or step a4) of the process according to the invention is preferably carried out in a pressure vessel at a pressure of 1 to 20 bar, more preferably at a pressure of 1.1 to 10 bar (absolute), most preferably at a pressure of 1.2 to 5 bar (absolute). At standard pressure, the boiling point of the solvent mixture used is usually between 80 and 100° C. By analogy with the example of a pressure cooker, working in the pressure vessel allows step a4) according to the invention to be carried out at appreciably higher temperatures in the range 80-130° C., which increases the rate of reaction. This allows both the aging and the hydrophobization time to be drastically reduced (for example an aging time reduction from 24 hours at 65° C. to just 3 hours at 90° C.), which results in a considerable increase in process efficiency.

In a particularly preferred embodiment of the invention, the hydrophobization of the silica according to step a4) is carried out at a temperature of 80 to 130° C., at a pressure of 1.2 to 4 bar, within 20 to 180 minutes.

In step b) of the inventive process, drying of the hydrophobized silica gel obtained in step a) is carried out. This step b) can be carried out under subcritical or supercritical conditions, preferably under subcritical conditions.

Under "subcritical conditions" it is understood that the critical parameters specific to the solvent used, such as temperature and pressure, are not exceeded. Under "supercritical conditions", these parameters, on the contrary, must be exceeded. Under supercritical conditions, the solvent mixture (pore liquid) used is accordingly present as a supercritical fluid during drying. The critical temperature and critical pressure for $CO_2$ are, for example, around 31° C. and around 74 bar.

In step b) of the process according to the invention, the volatile constituents present in the hydrophobized silica gel, such as alcohols and residual hydrophobizing agent for example, are removed by evaporative drying, leaving behind the ultimate aerogel structure. In this step, preferably over 95%, more preferably over 98%, of all volatile constituents are removed. Volatile constituents of the mixture are understood as meaning all components that have a boiling point of less than 200° C. at standard pressure.

In a preferred embodiment of the invention, step b) is carried out at least partially under reduced pressure, more preferably at an absolute pressure of 0.1 to 1 bar. Drying under reduced pressure has the advantage that it may be carried out at low temperature, i.e. with reduced thermal energy requirements. Working under reduced pressure thus achieves a lower content of residual solvents (residual moisture) in the aerogel material at the same temperature, particularly at the end of drying, From a process technology viewpoint, on the other hand, the transfer of heat through convective gas exchange with the material being dried increases with increasing pressure, which in turn reduces the drying time and boosts process efficiency. Step b) of the process according to the invention is particularly preferably carried out at a temperature of 100 to 200° C. and at a pressure of 0.1 to 4 bar.

In a further preferred embodiment of the invention, during the performance of step b) a carrier gas is passed into the reactor continuously and, after mixing with the gaseous constituents of the reactor, in turn exits the reactor. This allows the drying step to be shortened considerably and/or enables the production of aerogel materials having low residual moisture. The carrier gas used may be nitrogen, for example. The carrier gas used is particularly preferably preheated to a temperature of 50 to 200° C. The preheated carrier gas may advantageously be introduced into the reactor through a pressure adjustment from 1 to 4 bar. This promotes heat transfer between the gas introduced and the solid/liquid reaction mixture in the reactor. It has been found to be particularly advantageous when the gas input into the reactor per unit time and reactor volume corresponds to a gas hourly space velocity (GHSV) of 150 to 1500 $h^{-1}$, where:

GHSV [$h^{-1}$]=Gas input into the reactor in L per hour/reactor volume in L

In step c) of the inventive process, treatment of the product obtained in step b) with a gas mixture comprising water and a base or an acid, preferably a sufficiently volatile one, takes place. The purpose of this step c) of the process is to optimize the working together of water as a reactant and the acid or base catalyst in order to achieve a maximum degree of hydrolysis of residual alkoxy groups, e.g. ethoxy groups, present in the hydrophobized silica gel obtained in step b) of the process.

The base or the acid used in step c) of the process is preferably suitable for catalysing the hydrolysis of the alkoxysilane groups Si—O—R, wherein R can be e.g. methyl, ethyl, propyl, butyl, or other alkyl groups. Such base or acid catalysts, preferably, do not lead to the hydrolysis of the sterically hindered siloxyl groups, such as Si—O—SiR$^1$$_3$, wherein R$^1$ is preferably methyl.

The base used in step c) of the process is preferably selected from the group consisting of ammonia, lower aliphatic alkylamines, such as trimethylamine, dimethylamine, diethylamine, and mixtures thereof.

The acid suitable for use in step c) of the process can be selected from the group consisting of volatile mineral acids such as hydrochloric acid (HCl), hydrofluoric acid (HF), hydrobromic acid (HBr), hydroiodic acid (HI), nitric acid ($HNO_3$), carboxylic acids such as formic acid and acetic acid, halosilanes such as trimethylchlorosilane, and mixtures thereof.

Water and the base or the acid are present in gas (vapour) form in step c) of the process. This can facilitate the hydrolysis of alkoxy groups in step c) and makes the subsequent drying of the treated aerogel unnecessary.

In step c) of the process, the molar ratio of water to the base or to the acid is preferably at least 4, more preferably at least 5, more preferably at least 10.

The gas mixture used in step c) of the process according to the invention can further comprise a carrier gas, e.g. nitrogen, air, argon.

An aqueous solution of the base, e.g. of ammonia, or of the acid, e.g. of hydrochloric acid, can be vaporized by introducing a carrier gas, e.g. nitrogen or air into this solution and thus providing a gas mixture of the carrier gas, water and the base or the acid, which can be directly used in step c) of the inventive process.

The temperature kept during step c) of the inventive process is preferably 50° C. to 250° C., more preferably 75° C. to 200° C., more preferably 100° C. to 180° C., more preferably 120° C. to 170° C.

The duration of step c) of the inventive process is preferably from 1 minute to 1000 minutes, more preferably from 2 minutes to 500 minutes, more preferably from 3 minutes to 200 minutes, more preferably from 4 minutes to 100 minutes, more preferably from 5 minutes to 30 minutes.

The invention further provides silica aerogel, comprising trimethylsiloxyl (≡SiOSiMe$_3$), alkoxysilyl (≡SiOR) and silanol (≡SiOH) groups, characterized by an envelope density of at most 0.17 g/cm$^3$;

a ratio of the amount of the trimethylsiloxyl groups (≡SiOSiMe$_3$) to the sum of the amount of the trimethylsiloxyl, the alkoxysilyl and the silanol groups $N_{SiOSiMe3}/(N_{SiOSiMe3}+N_{SiOR}+N_{SiOH})$ of more than 0.5, preferably more than 0.6, more preferably more than 0.7 and a ratio of the amount of the alkoxysilane groups to the sum of the amount of the alkoxysilane and the silanol groups $N_{SiOR}/(N_{SiOR}+N_{SiOH})$ of 0.05 to 0.35, preferably 0.10 to 0.32, more preferably 0.15 to 0.30;

wherein R is an alkyl group, preferably an alkylalkoxy group such as methyl, ethyl, propyl, butyl, more preferably methyl or ethyl, the amount of the trimethylsiloxyl (≡SiOSiMe$_3$) and alkoxysilyl (≡SiOR) groups is determined by $^1$H-NMR and the amount of the silanol (≡SiOH) groups is determined by $^{29}$Si-NMR, preferably according to the protocol described in W. J. Malfait et al. Chem. Mater. 2015, Vol. 27, pp. 6737-6745.

Envelope density of the inventive silica aerogel is at most 0.17 g/cm$^3$, preferably from 0.05 g/cm$^3$ to 0.160 g/cm$^3$, more preferably from 0.07 g/cm$^3$ to 0.150 g/cm$^3$, more preferably from 0.08 g/cm$^3$ to 0.140 g/cm$^3$.

Envelope density can be determined for large grained (typically >1-2 mm) porous materials when large internal pore volume within said material exclude a direct measurement using for example a simple buoyancy technique. In this case, the granular material specimen to be tested is surrounded by a medium that does not penetrate pores but conforms to irregular surface contours to form a tight-fitting "envelope", e.g. a free-flowing dry powder medium.

Envelope density can be determined by powder pycnometry, e.g. using a GeoPyc 1360 device (Micromeritics).

The amount of the trimethylsiloxyl (≡SiOSiMe$_3$) and alkoxysilyl (≡SiOR) groups is determined by $^1$H-NMR analysis. Particularly, quantitative solid state NMR magic angle spinning (MAS) techniques with known substance referencing for quantification are used. The peak corresponding to the signal of the methyl of the trimethylsiloxyl (≡SiOSiMe$_3$) group is determined. For determination of alkoxysilyl (≡SiOR) groups, any proton of the alkoxy group, whose signal does not significantly overlap with other protons in the $^1$H spectra, can be used. For methoxy or ethoxy groups, the protons of the methyl groups are used.

$^1$H-NMR spectra can be recorded with wide-bore 9.4 T magnets, corresponding to Larmor frequency of 400.2 MHz using spectral width of 249.9 ppm and acquisition time of 328 ms. applying a 24 kHz MAS rate in 2.5 mm zirconia rotors can be used to minimize line widths. All spectra are usually collected with a recycle delay of at least 5 time the T1 relaxation time, as determined by saturation recovery experiments, to ensure their quantitative nature. Fully relaxed spectra of adamantane and octakis(trimethylsiloxy) silsesquioxane (Q8M8) can be used for calibration of the absolute NMR signal intensities.

The amount of the silanol (≡SiOH) groups is determined by solid state MAS-$^{29}$Si-NMR from the difference in $Q^3$ species and alkoxy groups, assuming that each $Q^3$ species is linked to either an alkoxy or a hydroxyl group.

$^{29}$Si-NMR spectra can be recorded with wide-bore 9.4 T magnets, corresponding to Larmor frequency of 79.5 MHz using spectral width of 349.3 ppm and acquisition time of 74 ms. Bruker Avance III HD system applying a 4 kHz MAS rate in 7 mm zirconia rotors can be used to minimize line widths.

All NMR spectra ($^1$H and $^{29}$Si) are usually collected with a recycle delay of at least 5 T1, as determined by saturation recovery experiments, to ensure their quantitative nature. Fully relaxed $^1$H-NMR spectra of adamantane and octakis (trimethylsiloxy)silsesquioxane (Q8M8) can be used for calibration of the absolute $^1$H-NMR signal intensities, $^{29}$Si-NMR spectra of octakis(trimethylsiloxy)silsesquioxane (Q8M8)—for calibration of $^{29}$Si-NMR spectra.

All samples and standards are preferably measured on completely filled rotors to ensure that potential inhomogeneity in sensitivity due to gradients in the ratio frequency (RF) field strength cancel out during the intensity calibration and with sufficiently strong pulses to ensure uniform excitation: 83 kHz for $^1$H and 45 kHz for $^{29}$Si, respectively.

The details of the quantitative determination of surface functional groups on the hydrophobized silica aerogels by NMR techniques can be found in W. J. Malfait et al. describe in Chem. Mater. 2015, 27, 6737-6745. The content of this publication relating to the solid NMR analysis is herewith incorporated by reference.

The inventive silica aerogel can be prepared by the process according to the invention.

The silica aerogel of the present invention preferably has particulate form, for example represents powder or granules. In the case of powders, this is understood as meaning particles having an average numerical particle size of up to 50 μm, whereas granules usually consist of particles having an average numerical particle size of 50 μm to 10 mm.

The silica aerogel according to the invention can be in the form of powder or, preferably, in the form of granules having e.g. an average numerical particle size $d_{50}$ of 50 μm to 10 mm, more preferably 100 μm to 5 mm. The numerical average particle size of the powder or granules can be determined according to ISO13320:2009 by laser diffraction particle size analysis. The resulting measured particle size distribution is used to define the average $d_{50}$, which represents, as the numerical average particle size, the particle size not exceeded by 50% of all particles.

Thermal conductivity of the inventive silica aerogel is preferably from 12 mW/(mK) to 25 mW/(mK) at standard pressure and 20° C. The thermal conductivity of the aerogel bulk material in the form of powder or granules can be measured according to EN 12667:2001 at an average measuring temperature of 20° C., under an atmosphere of air, and at standard pressure.

The silica aerogel of the invention can have a BET surface area of greater than 300 m$^2$/g, preferably of 400 m$^2$/g to 1000 m$^2$/g, more preferably of 450 m$^2$/g to 900 m$^2$/g, more preferably of 550 m$^2$/g to 850 m$^2$/g. The specific surface area, also referred to simply as BET surface area, can be determined according to DIN 9277:2014 by nitrogen adsorption in accordance with the Brunauer-Emmett-Teller method.

The invention further provides the use of the inventive silica aerogel for thermal and/or acoustic insulation.

The inventive silica aerogel can be used as a bulk material for thermal and/or acoustic insulation, for example in thermal insulation containers; in pasty applied formulations such as plaster, mortar, and concrete formulations; in thermally and/or acoustically insulating coatings, for example as an energy-saving thermal insulation coating in industrial uses, as a constituent of thermally insulating textile and film membranes for lightweight architectural construction uses.

Another object of the present invention is composition for thermal and/or acoustic insulation comprising the inventive silica aerogel.

Such composition for thermal and/or acoustic insulation may be in the form of a thermal and/or acoustic insulation panel formed from the inventive silica aerogel material.

The composition for thermal and/or acoustic insulation or the corresponding panel can reduce the transmission of heat and/or sound and thus have thermal and/or acoustic insulation properties.

EXAMPLES

Comparative Example 1

A silicon dioxide sol concentrate was prepared by alcoholic hydrolysis of TEOS using a molar ratio of TEOS/water/sulfuric acid of 1:3.0:0.001 in ethanol at room temperature and an equivalent silica content, expressed as SiO$_2$ of 20 wt. % at 35° C. The sol concentrate was then allowed to rest overnight before use. The sol concentrate was then diluted with HMDSO and ethanol to the final sol concentration of 5.7 wt. % SiO$_2$ equivalents such that the HMDSO content in the sol was 30 wt. %. Thereafter, 2% by volume of a diluted ethanolic ammonia solution was added to this sol, which resulted in gelation within 8-10 minutes. The fresh organogel was placed inside a sealed steel tube pressure vessel, covered with a small amount of ethanol and aged at 95° C. for 2 h.

Following aging, the sealed tube was cooled to room temperature and carefully opened. The aged gel was then mechanically crushed, and the gel granulate particles again placed inside the steel tube. Subsequently, a mixture of dilute nitric acid, ethanol and HMDSO was added to barely cover the gel particles. The steel tube was sealed again and placed inside an oil bath at 100° C. where it was kept for hydrophobization for 2 h. Upon completion of the hydrophobization and cooling to 45° C., the gel particles were recuperated and subsequently dried in a convective drying oven under nitrogen at 150° C.

The final aerogel material had an envelope density of 0.115 g/cm$^3$ and a typical packed bed thermal conductivity of the granulate specimen of 0.0184 W/(m K). Other chemical data of the aerogel are summarized in Table 1.

Example 1: Production of an Aerogel Granulate Material at Laboratory Scale

The aerogel material with residual alkoxy groups obtained in comparative example 1 was then kept inside the same oven and the temperature of the oven was raised to 165° C. Once the new set temperature was reached, the oven was briefly opened, and a thin capillary tube connected to a syringe pump positioned under the aerogel specimen and the door closed again. The hydrolysis of ethoxy groups was now initiated by dosing a 6M aqueous ammonium hydroxide solution at a rate of 300 mL/h. The dosing was stopped after 40 minutes, and residual water/ammonia mixture inside the oven purged with nitrogen flow over the course of another 10 minutes. The final aerogel material was then recuperated and characterized, having an envelope density of 0.118 g/cm$^3$ and a typical packed bed thermal conductivity of the granulate specimen of 0.0184 W/(m K). Other chemical data of the aerogel are summarized in Table 1.

Example 2

A procedure was identical to the one described in example 1 with the exception that the drying temperature was 160° C. and that the ethoxy group hydrolysis step was carried out directly at the end of the drying step by beginning dosing of the ammonium hydroxide solution with the capillary having been placed at the beginning of the drying step. Physico-chemical data of the aerogel are summarized in Table 1.

Example 3

A procedure was identical to the one described in example 1 with the exception that the ethoxy group hydrolysis step was performed by injection of a 3M aqueous trifluouroacetic acid solution at a rate of 200 mL/h and the dosing was maintained over a period of 25 minutes. Physico-chemical data of the aerogel are summarized in Table 1.

Example 4: Industrial Production of an Aerogel Granulate Material

The pilot plant used consisted of a stirred batch reactor for the production of the sol and a tube bundle reactor with top and bottom hermetically sealed lids, as well as a downstream and additionally heated hydrophobization reactor vessel, a phase separation unit and a hybrid convection/contact dryer unit. The device periphery was made up of the appropriate auxiliary units (heating, heat exchanger, condenser) and solvent reservoirs as well as storage for the various reagents. The tube bundle reactor consisted of a heat exchanger of parallel tubes, each with an inner diameter of 23 mm, and a jacket that could be purged with a heat transfer fluid medium. The reactor was mounted to the floor of the factory site at a fixed angle of 19° to the horizontal.

At the beginning, 76 L of a sol consisting of 30 kg of ethanol, 30 kg of sol concentrate, 4.3 kg of water and 25.8 kg of HMDSO were prepared by diluting a PEDS sol concentrate with ethanol and HMDSO in a stirred reactor and preheated to 45° C. Then dilute ethanolic ammonia solution was added and the sol thus activated was transferred via a transfer line with pressure equalization to the tube bundle reactor preheated to 60° C. both both lids closed. Following transfer of the sol, top and bottom valves to the reactor were also closed, as a result of which the heat exchanger tubes, together with the gel rods that formed, were isolated inside a tightly sealed reactor.

The temperature of the reactor was then raised to 112° C. by heating the heat exchanger medium. The pressure rose rapidly to a value of 2.5 bar. After an aging time of 60 minutes, the bottom and top valves were carefully opened and the syneresis fluid was released into the release vessel. The heating of the tube bundle heat exchanger was now reduced to 102° C. Now 18.5 l of a dilute sulfuric acid solution in ethanol which had been mixed and preheated to 60° C. inside the stirred batch reactor was pumped into the reactor and circulated at a constant flow of 4 l/min. The hydrophobization catalyst was then pumped for an additional 75 minutes at the same temperature.

Once the hydrophobization was complete, the reactor was quickly cooled to a temperature of 73° C. and vented to ambient pressure. The reactor bottom lid was opened and the resulting hydrophobized gel bars were separated from the liquid phase by the phase separation unit and transferred to the dryer unit, where the gels were dried under a stream of nitrogen at 160° C. to constant weight. After the drying unit, the aerogel granulate was sent through a heated tunnel with a residence time of 17 minutes containing an atmosphere of 1.1 vol % of ammonia and 350 mbar of water vapour. At the end of this tunnel, the final aerogel material was recuperated through a load lock system.

The analysis of the material showed an envelope density of 0.108 g/cm$^3$ and a thermal conductivity of the bed of 17.9 mW/(m K). Other chemical data of the aerogel are summarized in Table 1.

TABLE 1

Physico-chemical properties of the prepared aerogels.

| Example | Envelope density [g/cm$^3$] | $N_{SiOSiMe3}$ [mmol/g] | $N_{SiOR}$ [mmol/g] | $N_{SiOH}$ [mmol/g] | $N_{SiOSiMe3}/(N_{SiOSiMe3} + N_{SiOR} + N_{SiOH})$ | $N_{SiOR}/(N_{SiOR} + N_{SiOH})$ |
|---|---|---|---|---|---|---|
| Comparative Example 1 | 0.115 | 2.8 | 0.55 | 0.95 | 0.65 | 0.37 |
| Example 1 | 0.118 | 2.8 | 0.42 | 1.20 | 0.65 | 0.26 |
| Example 2 | 0.122 | 2.8 | 0.48 | 1.25 | 0.62 | 0.28 |

TABLE 1-continued

Physico-chemical properties of the prepared aerogels.

| Example | Envelope density [g/cm$^3$] | $N_{SiOSiMe3}$ [mmol/g] | $N_{SiOR}$ [mmol/g] | $N_{SiOH}$ [mmol/g] | $N_{SiOSiMe3}/(N_{SiOSiMe3} + N_{SiOR} + N_{SiOH})$ | $N_{SiOR}/(N_{SiOR} + N_{SiOH})$ |
|---|---|---|---|---|---|---|
| Example 3 | 0.128 | 2.6 | 0.35 | 1.42 | 0.59 | 0.20 |
| Example 4 | 0.108 | 2.7 | 0.31 | 1.52 | 0.60 | 0.17 |

The envelope density was measured by powder pycnometry using a GeoPyc 1360 device (Micromeritics).

The amount of the trimethylsiloxyl (≡SiOSiMe$_3$) and alkoxysilyl (≡SiOR) groups is determined by $^1$H-NMR and the amount of the silanol (≡SiOH) groups is determined by $^{29}$Si-NMR, as described in W. J. Malfait et al. describe in Chem. Mater. 2015, 27, 6737-6745.

The invention claimed is:

1. A process for producing a hydrophobized silica aerogel, comprising the following steps:
    a) preparing a hydrophobized silica gel comprising alkoxy groups;
    b) drying the hydrophobized silica gel obtained in step a);
    c) treating the hydrophobized silica gel dried in step b) with a gas mixture comprising water and a base or an acid.

2. The process of claim 1, wherein the alkoxy groups are alkylalkoxy groups selected from the group consisting of: methoxy (OCH$_3$); ethoxy (OC$_2$H$_5$); propoxy (OC$_3$H$_7$); butoxy (OC$_4$H$_9$); and mixtures thereof.

3. The process of claim 1, wherein the silica gel is obtained by hydrolysis of an organosilicate selected from the group consisting of: tetraethyl orthosilicate (TEOS); tetramethyl orthosilicate (TMOS); tetraisopropyl orthosilicate (TPOS); and mixtures or oligomers thereof.

4. The process of claim 1, wherein the silica gel is obtained by gelification of an inorganic precursor selected from the group consisting of: sodium silicate; waterglass; ion exchanged waterglass; silicic acid; colloidal silica; and mixtures thereof.

5. The process of claim 1, wherein step a) is carried out using a hydrophobizing agent activatable by an acid catalyst selected from the group consisting of: hydrogen chloride; nitric acid; sulfuric acid; trimethylchlorosilane; and mixtures thereof.

6. The process of claim 5, wherein step a) is carried out using a hydrophobizing agent selected from the group consisting of: hexamethyldisiloxane; trimethylethoxysilane; trimethylmethoxysilane; and mixtures thereof.

7. The process of claim 1, further comprising a gelation of the silica sol and optionally aging of the resulting silica gel in the presence of a base catalyst selected from the group consisting of: ammonia; ammonium fluoride; aminosilanes; and mixtures thereof.

8. The process of claim 1, wherein step b) is carried out under subcritical conditions.

9. The process of claim 1, wherein the base used in step c) of the process is selected from the group consisting of: ammonia; lower aliphatic alkylamines; and mixtures thereof.

10. The process of claim 1, wherein the acid used in step c) of the process is selected from the group consisting of: a volatile mineral acid; a carboxylic acid; a halosilane; and mixtures thereof.

11. The process of claim 10, wherein the volatile mineral acid is selected from the group consisting of: hydrochloric acid (HCl); hydrofluoric acid (HF); hydrobromic acid (HBr); hydroiodic acid (HI); and nitric acid (HNO$_3$); the carboxylic acid is formic acid or acetic acid; and the halosilane is trimethylchlorosilane.

12. The process of claim 1, wherein step c) is conducted at the temperature of 50° C.-250° C.

13. The process of claim 1, wherein the duration of step c) is 1 minute-1000 minutes.

14. The process of claim 2, wherein the silica gel is obtained by hydrolysis of an organosilicate selected from the group consisting of: tetraethyl orthosilicate (TEOS); tetramethyl orthosilicate (TMOS); tetraisopropyl orthosilicate (TPOS); and mixtures or oligomers thereof.

15. The process of claim 2, wherein the silica gel is obtained by gelification of an inorganic precursor selected from the group consisting of: sodium silicate; waterglass; ion exchanged waterglass; silicic acid; colloidal silica; and mixtures thereof.

16. The process of claim 2, wherein step a) is carried out using a hydrophobizing agent activatable by an acid catalyst selected from the group consisting of: hydrogen chloride; nitric acid; sulfuric acid; trimethylchlorosilane; and mixtures thereof.

17. The process of claim 16, wherein step a) is carried out using a hydrophobizing agent selected from the group consisting of: hexamethyldisiloxane; trimethylethoxysilane; trimethylmethoxysilane; and mixtures thereof.

\* \* \* \* \*